United States Patent [19]
Awaji et al.

[11] Patent Number: 5,634,540
[45] Date of Patent: Jun. 3, 1997

[54] FIXING STRUCTURE FOR OUTER RING IN ONE-WAY CLUTCH

[75] Inventors: Toshio Awaji; Hirofumi Ogata, both of Shizuoka, Japan

[73] Assignee: NSK-Warner K.K., Tokyo, Japan

[21] Appl. No.: 340,409

[22] Filed: Nov. 15, 1994

[30] Foreign Application Priority Data

Nov. 15, 1993 [JP] Japan .................................. 5-320801

[51] Int. Cl.⁶ .................................................. F16D 41/06
[52] U.S. Cl. .................... 192/41 R; 192/45.1; 188/82.84; 267/163; 267/158; 411/156
[58] Field of Search ........................ 192/41 R, 45, 192/45.1; 188/82.84; 267/158, 161, 163; 411/148, 154, 155, 156, 544

[56] References Cited

U.S. PATENT DOCUMENTS

| | | | |
|---|---|---|---|
| 2,817,380 | 12/1957 | Knohl | 411/154 X |
| 3,344,686 | 10/1967 | Baker | 192/45.1 X |
| 4,757,887 | 7/1988 | Ostrander et al. | 192/41 A |
| 4,874,069 | 10/1989 | Lederman | 192/45 |
| 4,883,152 | 11/1989 | Froment | 192/41 R |
| 4,979,600 | 12/1990 | Zanoni | 192/45.1 X |
| 5,004,090 | 4/1991 | Kuribara et al. | 192/45 X |
| 5,042,628 | 8/1991 | Malecha | 192/45 |
| 5,076,408 | 12/1991 | Numata et al. | 192/45.1 X |
| 5,139,123 | 8/1992 | Rutke | 192/45.1 |
| 5,156,245 | 10/1992 | Fujiwara et al. | 192/45.1 X |
| 5,328,012 | 7/1994 | Takata | 192/45 |

FOREIGN PATENT DOCUMENTS

| 5180 | 3/1991 | Japan . |
|---|---|---|
| 4-109231 | 9/1992 | Japan . |

*Primary Examiner*—Andrea L. Pitts
*Attorney, Agent, or Firm*—Evenson, McKeown, Edwards & Lenahan, P.L.L.C.

[57] ABSTRACT

A fixing structure is provided for an outer ring in an one-way clutch. The fixing structure includes a ring-shaped leaf spring having angular waviness, interposed between an outer side wall of the outer ring and an opposing inner wall of a housing and integrally assembled on a stepped outer peripheral portion of the outer ring. The ring-shaped leaf spring has plural tabs on an inner peripheral edge portion thereof and is fixed by spring forces of the tabs immovably in the direction of an axis of the outer ring. The stepped outer peripheral portion of the outer ring preferably defines a circumferential slot therein and the tabs of the ring-shaped leaf spring are fitted in the circumferential slot, whereby any axial movement of the ring-shaped leaf spring is limited.

4 Claims, 4 Drawing Sheets

FIXING STRUCTURE FOR OUTER RING IN ONE-WAY CLUTCH

BACKGROUND OF THE INVENTION a) Field of the Invention

This invention relates to a fixing structure for an outer ring in a one-way clutch which is used as a torque-transmitting or backstop component in a drive system of an automotive vehicle or the like.

b) Description of the Related Art

In FIG. 7, the basic construction of a one-way clutch is shown with a portion thereof having been cut away. Illustrated in this drawing are an outer ring 10, an inner ring 20, a side wall 60 mounted on a side wall of the outer ring 10, rollers 50, springs 70, spring anchors 80, and a cam surface 90 formed on an inner peripheral wall of the outer ring 10. When the inner ring 20 rotates clockwise as indicated by arrow $R_1$, the inner ring 20 simply idles. The mechanism of such a one-way clutch mechanism is well known in the art, so that its detailed description is omitted herein.

FIG. 8 illustrates the above one-way clutch as assembled on a housing 45. Each spline 15 of the outer ring 10 is fitted in a corresponding keyway 46 in the housing 45. Designated at symbol 45a is an inner wall of the housing 45. Numeral 30 indicates a stopper ring for limiting any axial movement of the one-way clutch.

FIG. 9 shows, on an enlarged scale, a spline-fitted portion of the housing 45. The housing 45 is a casting so that no accurate dimensions can be expected thereon. To cope with this problem, an angular clearance a is left between the spline 15 of the outer ring 10 and a wall of its corresponding keyway 46 of the housing 45.

Whenever the inner ring 20 idles in the direction indicated by arrow $R_1$ in FIG. 7 or rotates in an opposite direction, the outer ring 10 is also caused to rotate in the same direction as the inner ring 20. As a result, a side wall of each spline 15 is caused to hit a side wall of the associated keyway 46 so that a sharp metallic hitting noise is hence produced.

As is illustrated in FIG. 8, it has therefore been devised to prevent any axial movement of the outer ring 10 for the prevention of production of a sharp metallic noise by interposing a spring 40 between an outer peripheral side wall of the outer ring 10 and the inner wall 45a of the housing so that the outer ring 10 is held immovably in an axial direction.

The spring 40 is however a separate part so that the spring 40 has to be assembled at the user's end prior to assembling the one-way clutch on the housing 45. This has resulted in the drawbacks that more assembling steps are needed and the assembly work is cumbersome and time-consuming.

SUMMARY OF THE INVENTION

With the foregoing in view, the present invention has as a primary object the provision of a fixing structure for an outer ring in a one-way clutch, which is free or substantially free of the above-described inconvenience, drawbacks and the like.

In one aspect of the present invention, there is thus provided a fixing structure for an outer ring in an one-way clutch, said fixing structure including a ring-shaped leaf spring having angular waviness, interposed between an outer side wall of said outer ring and an opposing inner wall of a housing and integrally assembled on a stepped outer peripheral portion of said outer ring. The ring-shaped leaf spring has plural tabs on an inner peripheral edge portion thereof and is fixed by spring forces of said tabs immovably in the direction of an axis of said outer ring.

According to the fixing structure of this invention for the outer ring, the ring-shaped leaf spring which has heretofore been provided as a separate part is integral with the outer ring. It is therefore only necessary to assemble the one-way clutch on the housing at the user's end. It is accordingly no longer required at the user's end to assemble the ring-shaped leaf spring on the outer ring, leading to the elimination of the assembling step of the ring-shaped leaf spring on the outer ring. Moreover, the one-way clutch can be handled with ease upon its assembly on the outer ring.

DETAILED DESCRIPTION OF THE INVENTION AND PREFERRED EMBODIMENTS

Figure 1:
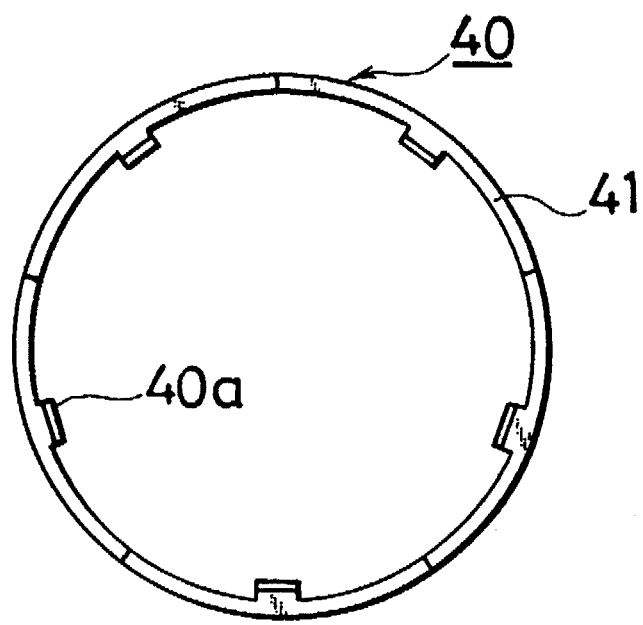
FIG. 1 is a front view of a ring-shaped leaf spring useful in the practice of the present invention.
Figure 2:
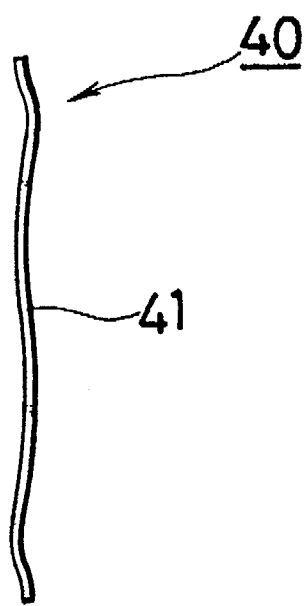
FIG. 2 is a side view of the ring-shaped leaf spring.

Referring first to FIGS. 1 and 2, the ring-shaped leaf spring useful in the practice of the present invention will be described. The spring, generally designated at numeral 40, is formed of a waved plate 41 having angular waviness, and plural tabs 40a are formed on an inner peripheral edge portion of the leaf spring 40.

Figure 3:
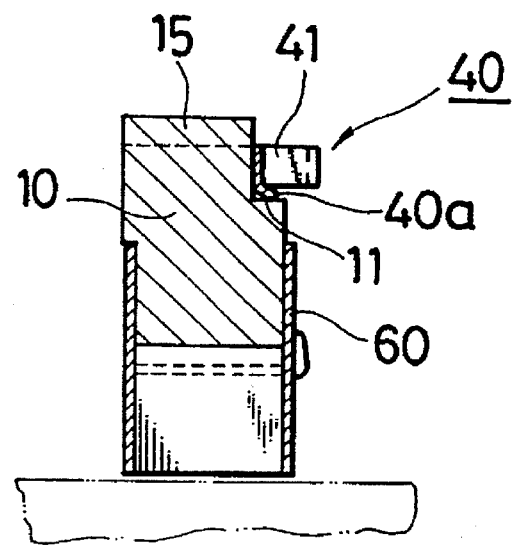
FIG. 3 is a cross-sectional view of a fixing structure according to a first embodiment of the present invention.

The fixing structure according to the first embodiment of this invention will next be described with reference to FIG. 3, in which there are shown the outer ring 10 and the side walls 60. The leaf spring 40 is fixed on a stepped outer peripheral portion 11 of the outer ring 10 by spring forces of the tabs 40a, so that the leaf spring 40 is not movable in an axial direction. Until the one-way clutch is assembled on the housing 45, the leaf spring 40 and the outer ring 10 remain as an integral structure.

Figure 4:
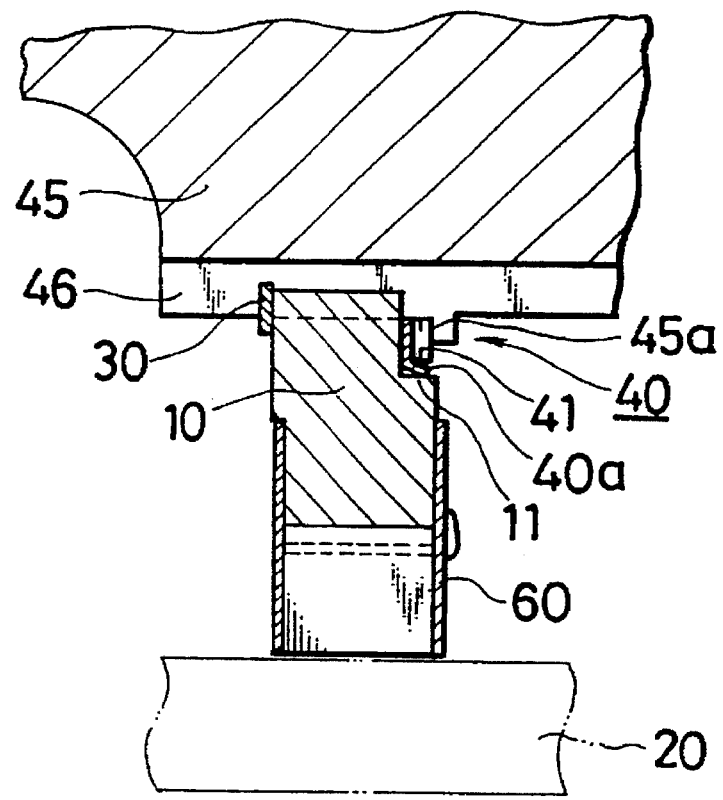
FIG. 4 is a cross-sectional view of a housing and a one-way clutch assembled on the housing by the fixing structure of FIG. 3.

Reference is next had to FIG. 4, in which the ring-shaped leaf spring 40 is interposed between the stepped outer peripheral portion 11 and the inner wall 45a of the housing 45, and the outer ring 10 is pressed against the stopper ring 30.

When the ring-shaped leaf spring 40 is compressed between the side wall of the outer ring 10 and the inner wall 45a of the housing 45, the ring-shaped leaf spring 40 expands radially. The spring forces of the tabs 40a formed on the inner peripheral edge portion of the outer ring 10 are hence lowered so that the force holding the leaf spring 40 on the stepped outer peripheral portion 11 is reduced. The ring-shaped leaf spring 40 can therefore move freely in the angular direction. Like conventional wave washers, the fixing structure according to the first embodiment has therefore brought about the advantage that production of a sharp metallic noise can be prevented by maintaining the leaf spring 40 in frictional contact with the outer side wall of the outer ring 10 and the inner wall 45a Of the housing 45 under the spring force which acts in the axial direction.

Figure 5:
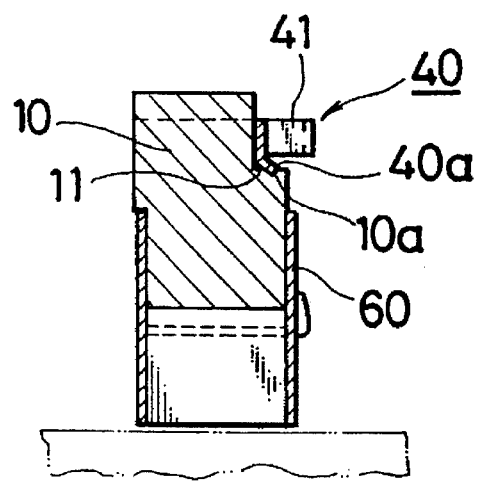
FIG. 5 is a cross-sectional view of a fixing structure according to a second embodiment of the present invention.
Figure 6:
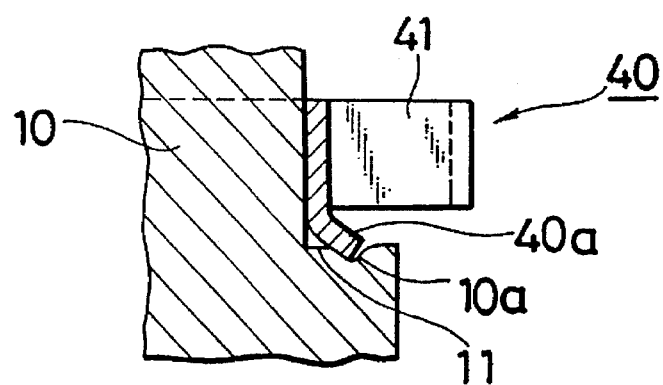
FIG. 6 is an enlarged fragmentary view of the fixing structure of FIG. 5, showing a leaf-spring-fitting portion.
Figure 7:
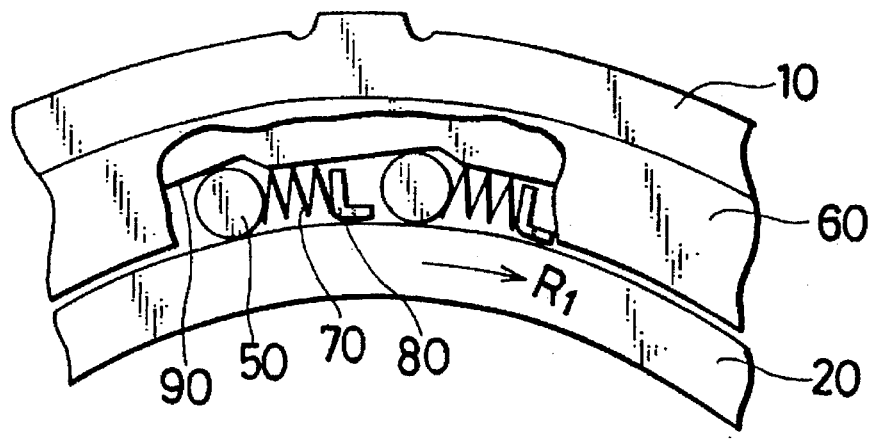
FIG. 7 is a front view of a conventional one-way clutch, in which a side wall is partly cut away to show an internal mechanism.
Figure 8:
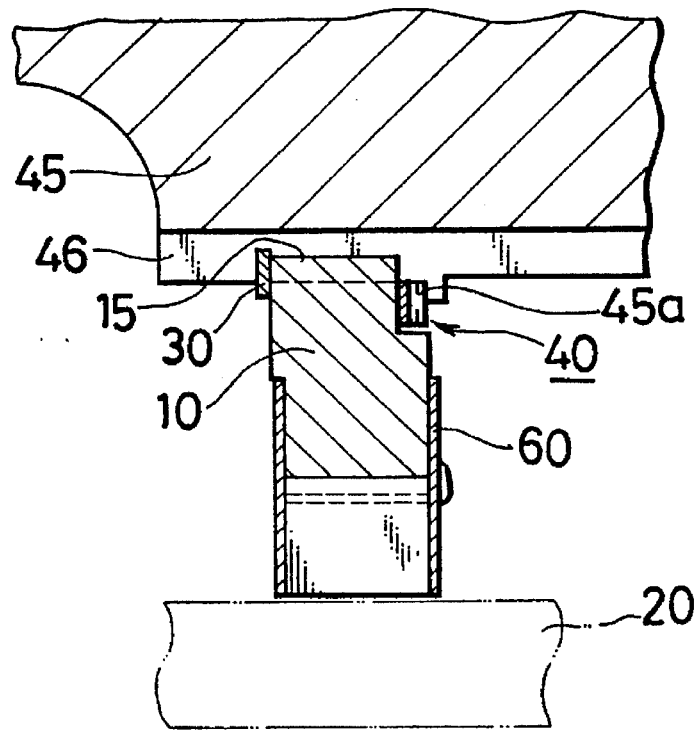
FIG. 8 is a cross-sectional view of the conventional one-way clutch as assembled on a housing.
Figure 9:
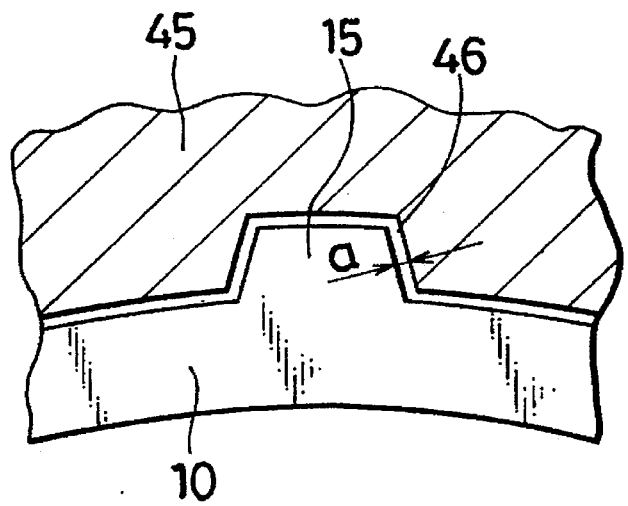
FIG. 9 is an enlarged view of a spline-fitted portion of the conventional one-way clutch as assembled on the housing.

The fixing structure according to the second embodiment of this invention will next be described with reference to FIGS. 5 and 6. A circumferential slot 10a is formed in the stepped outer peripheral portion 11. The tabs 40a formed on the inner peripheral edge portion of the spring 40 are fitted at free tip portions thereof in the circumferential slot 10a, whereby any axial movement of the spring 40 is limited further.

In the second embodiment described above, the circumferential slot 10a is formed as a complete circle in the stepped outer peripheral portion 11. Instead of such a continuous slot, short slots can be formed opposite to the tabs 40a. Further, the circumferential slot 10a can be replaced by a circumferential ridge or land formed on the stepped outer peripheral portion 11, for example, along a circumferential outer edge thereof. This ridge can also be arranged as short ridges at locations corresponding to the tabs 40a. It should be noted that the fixing structure making use of such short slots, circumferential ridge or short ridges also falls within the breadth of the present invention.

The above embodiments have been described with respect to a roller-type one-way clutch. Needless to say, the present invention can also be applied equally to sprag-type one-way clutches.

What is claimed is:

1. A fixing structure for an outer ring in a one-way clutch, said fixing structure comprising a ring-shaped leaf spring having angular wariness, interposed between an outer side wall of said outer ring and an opposing inner wall of a housing and integrally assembled on a stepped outer peripheral portion of said outer ring, wherein said ring-shaped leaf spring has plural tabs on an inner peripheral edge portion thereof and is fixed by spring forces of said tabs immovably against said outer ring in the direction of an axis of said outer ring.

2. A fixing structure according to claim 1, further comprising a circumferential slot formed in said stepped outer peripheral portion of said outer ring, and said tabs of said ring-shaped leaf spring are fitted in said circumferential slot, whereby any axial movement of said ring-shaped leaf spring is limited.

3. A fixing structure according to claim 2, wherein compression of said ring-shaped leaf spring between the outer side wall of the outer ring and the inner wall of the housing radially expands said ring-shaped leaf spring reducing the spring forces between the plural tabs and the circumferential slot of the outer ring, whereby said ring-shaped leaf spring can move freely in an angular direction.

4. A fixing structure for an outer ring in a one-way clutch, said fixing structure comprising a ring-shaped leaf spring having angular waviness, interposed between an outer side wall of said outer ring and an opposing inner wall of a housing and integrally assembled on a stepped outer peripheral portion of said outer ring, wherein said ring-shaped leaf spring has plural tabs on an inner peripheral edge portion thereof which extend both alongside and toward an axis of the outer ring, said leaf spring being fixed by spring forces of said tabs immovably in the direction of said axis of said outer ring.

* * * * *